George O. G. Löf
INVENTOR.

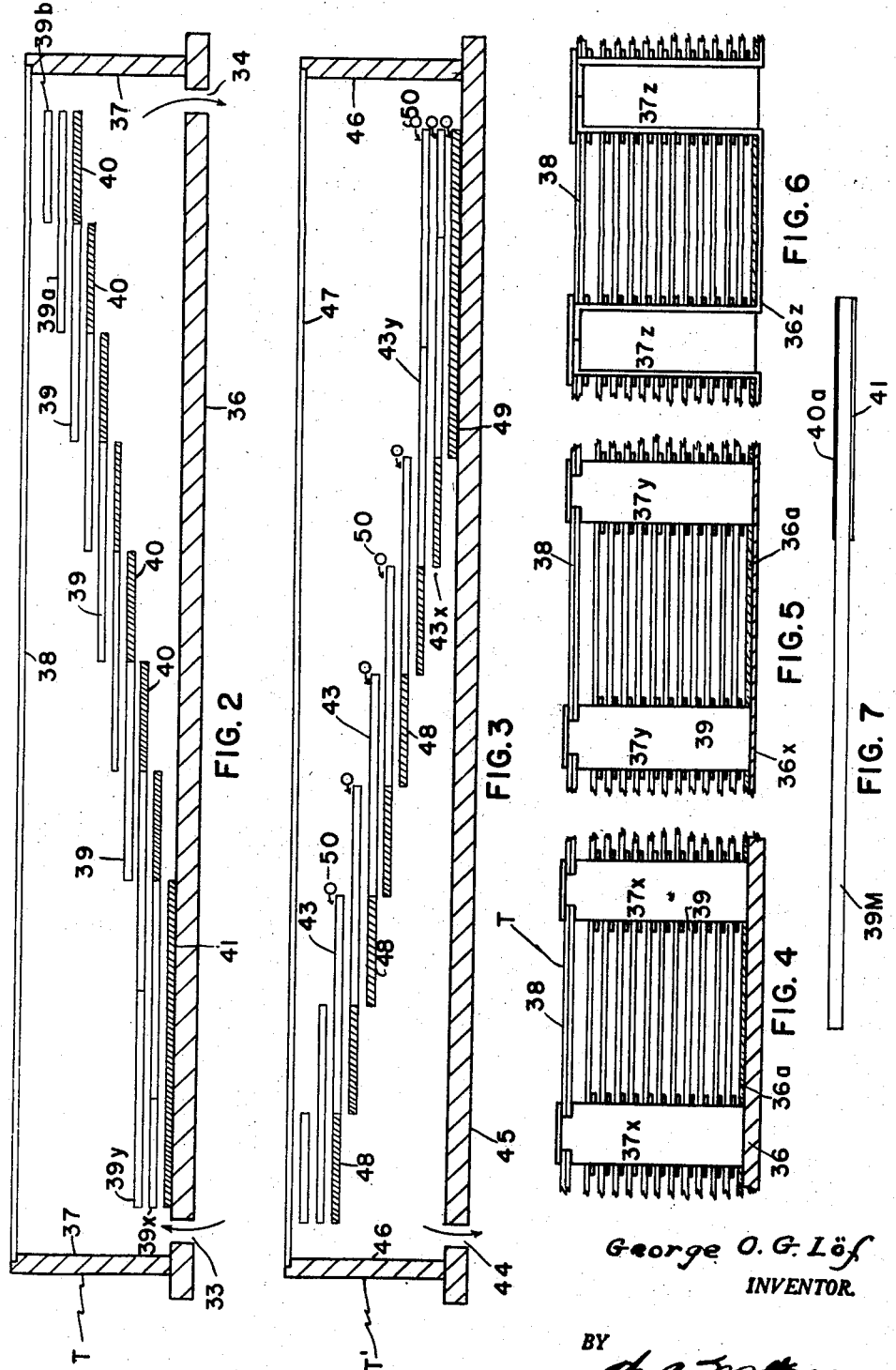

BY H. A. M^cGrew
ATTORNEY.

Patented June 8, 1954

2,680,565

UNITED STATES PATENT OFFICE 2,680,565

SOLAR HEATING APPARATUS AND METHOD

George O. G. Löf, Boulder, Colo., assignor to University of Colorado

Application December 3, 1945, Serial No. 632,504

19 Claims. (Cl. 237—1)

This invention relates to solar heating apparatus and methods and more particularly relates to solar heating systems for household and similar installations.

Solar heating and the use of solar heat traps has been well known and extensively used for such purposes as greenhouse heating and the like, but in the past, little effort has been made to utilize this heating source effectively in household installations. However, in recent years considerable study of the subject has been undertaken and with the changes and innovations being incorporated in present day architecture, solar heating systems are now recognized as a possible adjunct of future home building.

The present invention represents the culmination of a series of investigations undertaken to provide a suitable system for household heating and the like, which is adapted both for installation in existing structures and also for incorporation in new construction.

It is an object of the present invention to provide a simple, efficient and economical method of heating homes or similar structures.

Another object of the invention is to provide a simple, efficient and economical method of conditioning the circulating air of homes or similar structures both as to temperature and moisture content.

A further object of the invention is to provide a simple, durable and economical heating system adapted for installation in homes or similar structures, which is adapted to utilize the maximum effect of solar heating as an energy source in the temperature regulation, water heating, and other appliances of the heating and water supply installations of the structure.

Still another object of the invention is to provide a solar heat trap adapted for installation in existing homes or the like, which may be utilized as a heat exchange medium to heat air, water or other fluids.

Other objects reside in novel combinations and arrangements of parts and in novel steps and treatments, all of which will be described in the course of the following description.

The present invention resides in the discovery that a solar heat trap may be provided in household installations or the like, which contains a plurality of zones or passages, within which heat rays are caused to travel in opposed directions between heat transfer surfaces defining the passages or zones. Within these zones, a fluid, such as air or water, is circulated in contact with the heat transfer surfaces and after heating in this manner, the fluid is circulated to other portions of the structure to be there utilized as a source of heat for the structure or for appliances, the operation of which is essential in the use of the structure. Preferably, there is also incorporated in the system, means for limiting heat radiation within the confined zones and other means for storing excess heat released through said zones.

Having thus described in general the features of the present invention, reference will now be made to the accompanying drawings illustrating typical embodiments and practices of the invention. In the drawings, in the several views of which like parts have been designated similarly.

Fig. 2 is a vertical section through a heat trap unit embodying features of the present invention;

Fig. 3 is a vertical section through another form of heat trap unit also embodying features of the present invention;

Fig. 4 is a fragmentary section through a heat trap installation illustrating a preferred construction for use in existing structures;

Fig. 5 is a similar section illustrating a preferred arrangement for installation in structures under construction;

Fig. 6 is a similar section illustrating a preferred installation built as a prefabricated unit;

Fig. 7 is a side elevation of one of the heat exchange elements utilized in the heat traps of the present invention illustrating a preferred method of surface treatment and drawn to an enlarged scale;

Figure 1:
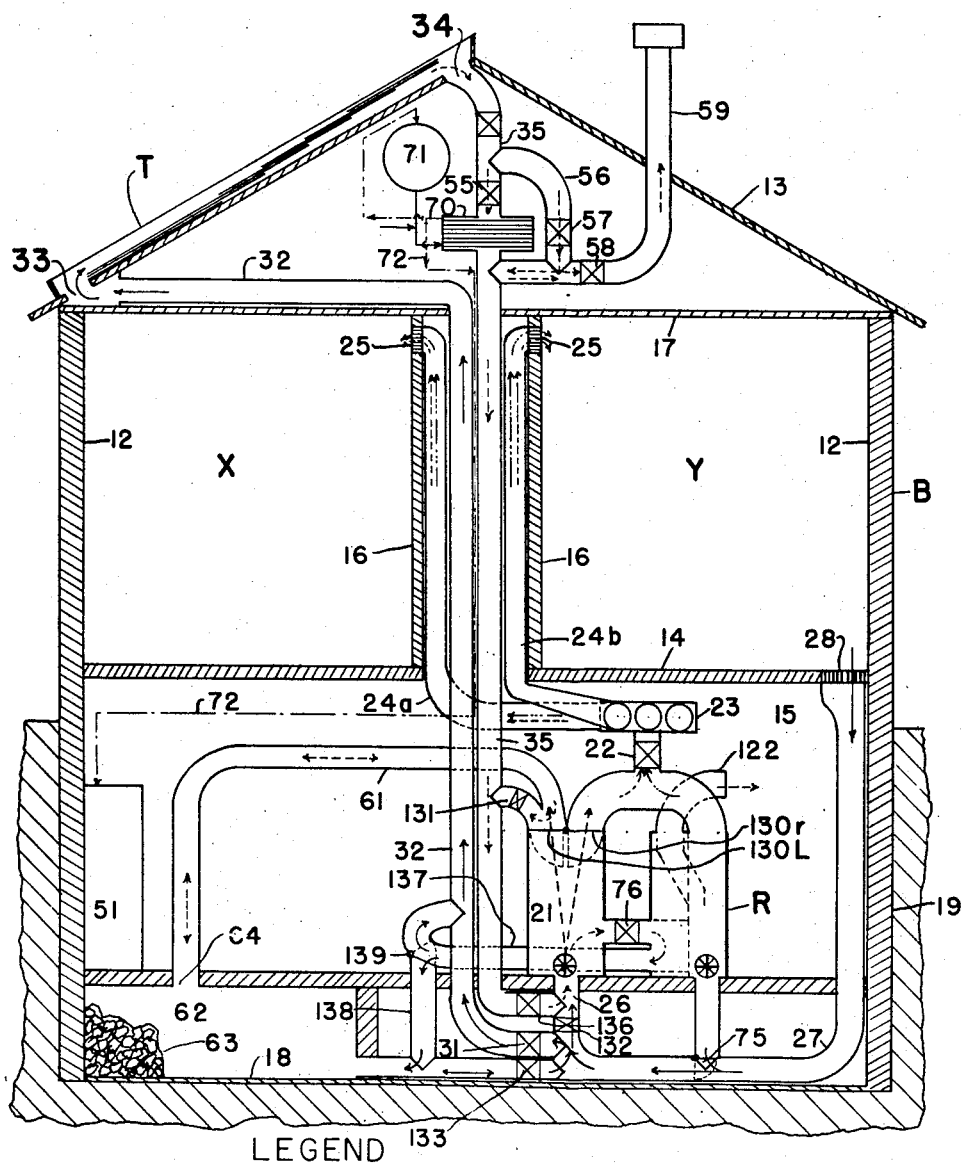
Fig. 1 is a vertical section through a structure utilizing the features of the present invention.

Fig. 1 illustrates an installation in a house or other habitation in which the various forms of solar heat utilization of the present invention have been combined in a single installation. It will be understood that for most purposes, liquid and air room heating installations will not be combined within the same structure, although under certain circumstances, it may be necessary or advisable to do so, for which reason both forms have been described or illustrated in the drawings. The air conditioning circuit illustrated is intended for use independently of or as an adjunct of the household heating system and a typical installation has been shown in Fig. 1. Also, the use of the solar heat source for heating the domestic water supply has been illustrated and this may either be a separate installation or incorporated as an adjunct to the existing household installation.

In Fig. 1, a building designated generally by the reference letter B is intended to illustrate a home or business structure and as shown embodies a two story construction, but which may be any number of stories within the capacity limits of the system to heat. As illustrated, the building has upright walls 12 covered by a roof 13 with a floor 14 partitioning the interior space into a basement 15 and other partitions 16 cooperating with the floor 14 and a ceiling 17 to divide the first floor space into a plurality of rooms designated X and Y. The basement is provided with a floor space 18 of any suitable material, such as concrete, and the foundation structure 19 for the building also may be any suitable material such as concrete.

A section of the roof 13 preferably located so as to have good exposure to the sun in both summer and winter is suitably apertured to receive a heat trap T, the details of which will be described hereinafter. When the heat trap T is to be utilized as a heating source for the building, it may be necessary to have it operating in conjunction with a stand-by heating plant and utilize a common system of conduits, outlets and the like and systems of this type have been illustrated in Fig. 1.

Within the basement 15 or in some other suitable area of building B, a furnace 21, preferably a blower-type circulating air heater, is located to deliver heated air through a valve controlled conduit 22 into a distributor 23 from which a series of conduits 24a and 24b deliver the heated air to room outlets 25. The furnace 21 also has a valve controlled intake 26 preferably supplied by a cold air duct 27 having its inlet opening 28 located as in the floor of room Y to provide a closed circuit air circulating system. However, it should be understood that if desired, an open circuit circulation may be employed, in which case the duct 27 would have its inlet located to receive atmospheric air from a point outside the building B. The furnace 21 may utilize any suitable type of fuel, such as coal, oil or gas and at such times, for example during the night hours, when the system may not utilize solar heating, the furnace is operated as in conventional installations to heat the rooms X and Y through discharge of heated air through outlets 25.

In utilizing the solar heating source in this circuit, at least a portion of the cold air entering through duct 27 is by-passed from the intake 26 through regulation of suitable valves 31 and 132 into a conduit 32 which in turn connects with the lower portion of heat trap T through a suitable opening 33 preferably located at the lower end of said trap. At the upper or opposite end of said trap, another opening 34 connects with a valve controlled conduit 35 which delivers heated air from the trap into furnace intake 26 and thence through the circulatory system as hereinbefore described. With this understanding of the general arrangement of the circulatory system, reference will now be made to the details of construction of the heat trap and its function and operation.

The arrangement shown in Fig. 2 illustrates a preferred construction for installations of the type just described. The unit comprises a framework having a bottom 36 and side walls 37 preferably forming a rectangular enclosure. The bottom and side walls may be formed of any suitable material, such as wood or metal, and preferably are of a dimension not requiring too great an unsupported surface for the glass parts now to be described. The top closure for the heat trap comprises a glass plate 38 supported at its sides and ends by the side walls 37. Although not shown, it will be understood that where it is necessary to protect the cover plate 38, as from hailstones or the like, a suitable wire screen or other protecting means permitting light penetration may be mounted in overhanging relation to plate 38. Within the enclosure thus formed, a series of glass plates 39 are mounted in spaced and substantially parallel relation and preferably staggered lengthwise of the enclosure in the manner shown. Each of said plates except special end plates 39a and 39b are provided at one end with an opaque and essentially non-reflecting area 40 preferably formed as by covering the said surface of the glass with black paint.

The opaque area thus provided preferably will be of a uniform length which is an even division of the total length of the plates 39. As here shown, the length of the opaque area is one third the length of the entire plate except at the lower end where one plate 39x is four times the length of its opaque area and another plate 39y is five times the length of its opaque area. Also at the lower end of trap T, the surface 41 of bottom 36 underlying the transparent portions of plates 39x and 39y is blackened in a manner similar to the plates 39, or a sheet of material, mounted on the bottom will have its upper surface blackened, as shown. Through the arrangement just described, solar heat rays entering through plate 38 are at all times directed against a blackened surface throughout the extent of the plate assembly. Obviously, the length of the opaque areas may be increased or decreased for a given sized plate and as long as the overall effect is similar to that just described, satisfactory results will be obtained.

While the arrangement of the heat trap T thus far described is adequate for most purposes, more satisfactory results will be obtained by providing a reflective medium throughout the opaque area of the glass plates 39. Such an arrangement has been shown in Fig. 7, in which a glass plate 39M having an opaque area provided by applying black paint 40a to its top surface has the portion of its undersurface underlying paint 40a covered with a reflective material such as aluminum foil 41. Through the use of the light reflective medium, a uniform reflective surface or surface effect is obtained which serves to retard heat losses occasioned by temperature differentials between glass plates 39 and bottom 36.

The arrangement of opaque and transparent surfaces just described has the further advantage that as viewed from underneath, the blackened areas provide a uniform reflecting surface. Because of this, the heat emanating from the blackened surfaces by reason of the stoppage of the solar heat rays travels in a reverse direction to said rays with the result that with respect to any given plate, both its top and bottom surfaces are substantially heated. Therefore, when cold air flowing through duct 32 enters the enclosure and passes between the several plates 39, a heat exchange action results which imparts an upward flow to the entering air and aids its travel to a point of escape at opening 34, although the primary air movement is induced by the blower in furnace 21. Due to the aforesaid heat exchange action, a substantial increase in temperature results so that the heated air passing through opening 34 comprises an adequate heating medium for the building. This air travels through conduit 35, enters furnace intake 26 and is then moved by the blower actuation to the distributor 23 and circulated through the rooms in the manner hereinbefore described.

With either type of heat trap as herein described, the parallel arrangement of the glass plates having opaque and transparent areas provides a multiple air film thermal insulation, as well as providing heat transfer surfaces to the air flow between the plates heated by solar radiation. Consequently, the solar heat is transformed to warm air at temperatures high enough to be adequate for house heating purposes even in extremely cold weather, and by providing sufficient capacity through the use of a battery of such heat traps, preferably arranged in adjoining relation, it is possible to generate sufficient heat to function as a heat source for various household appliances, in addition to supplying the required amount of heat for house heating purposes.

For most purposes, the heat trap will be utilized to heat a circulating air stream in the manner just described. However, it is practical to utilize this heat source in heating other fluids, such as water for example. Fig. 3 illustrates such an arrangement in which the trap T' is arranged to have liquid flow between the parallel plates 43 which are generally similar to the plates 39 of Fig. 2 and pass from the enclosure through a lower outlet 44 in the bottom 45 of an enclosure similar to trap T, having side walls 46 and a transparent cover plate 47. As in the other form, the plates have opaque areas 48 preferably covered with black paint and the surface of the bottom 45 underlying the transparent portion of end plates 43x and 43y is covered with black paint as shown at 49.

In this form of assembly, the upright walls 46 and bottom 45 will have to be joined in watertight relation to confine the liquid and prevent leakage into other parts of the structure in which the heat trap is located. As installed, trap T' will be located in an inclined position with the outlet 44 constituting the low point through which the released liquid will flow. The liquid is introduced into trap T' by a series of pipes 50 supplied from one or more headers (not shown) and the conduits have a series of jet or spray outlets from which liquid passes on to the upper ends of the respective plates 43, 43x, 43y and 49.

These plates are heated in the same manner as previously described through the arrangement of transparent and opaque surfaces and the liquid flowing downwardly along the plates is subjected to an intense heat-transfer action with the result that when it collects at the lower end of trap T' and passes through outlet 44, it is at a temperature adequate for the requirements of the household system. Any vapors generated in the heat exchange action will rise in contact with the under-surface of the overhanging plate and thus are subjected to further heat exchange action. Other vapors passing out of the upper ends of the passages between parallel plates and heated air within the enclosure tend to collect in the upper end of the enclosure and act as an additional heat source to assist in the overall heat transfer action of the unit. Moisture condensing at any point in the upper part of the enclosure will ultimately fall on to one of the heat transfer surfaces and then descend along same to reach the outlet 44.

In use, the outlet 44 will be connected with a suitable conduit to deliver the collected contents to a storage receptacle or some other point of ultimate use within the structure. Where the units of this type are to provide the circulating water for a household radiation system, for example, it usually will be necessary to have several of such units arranged as a battery to provide the necessary capacity. When a lesser quantity of heated water is required, as for example in supplying a hot water storage tank, a single unit will provide the required amount of heated water.

From the foregoing description, it will be apparent that the structural arrangements of the present invention may be utilized in heating a variety of fluids of which air and water are typical. Referring again to the arrangement of the circulating system shown in Fig. 1 hereinbefore described, it will be apparent that the various controls of valves, dampers, blower and the like may be automatically controlled as by thermostat regulation, for example.

It will be apparent that in the operation of the system thus far described, the heat trap T on clear days may produce an excess amount of heated air during at least a portion of its operating period. Two satisfactory methods of handling this excess have been shown in Fig. 1. For example, in the roof installation, a valve 55 may be operated to close conduit 35 and cause the heated air passing therethrough to enter a by-pass conduit 56. Through suitable regulation of other valves 57 and 58, a portion of the hot air flowing through conduit 56 will pass into a stack outlet 59 while the remainder will flow back into conduit 35 and thence pass to furnace intake 26. If the aforesaid by-pass arrangement is not being utilized in the system, valves 57 and 58 are closed and valve 55 is open to permit the direct flow of air through conduit 35. After delivery into furnace 21, a portion of the heated air may be diverted through suitable damper regulation and passed into a conduit 61 which discharges into a heat storage bin 62.

Preferably, this bin is sealed and insulated from the atmosphere except for the inlet and outlet openings hereinafter to be described and a large portion of the volume of the bin is filled with a heat absorbing and retaining material 63 which preferably is a loose or spaced solid, such as sand, gravel or stacked brick, but which may be a fluid, such as tar, oil, water or the like. Consequently, when the excess of heated air discharged by furnace 21 into conduit 61 is delivered through a suitable opening 64 into bin 62, the bed 63 is gradually heated and functions as a heat storage unit of the system, and the air, after heat extraction, is recirculated to the heat trap through conduit 32. Subsequently, when heated air is no longer supplied to the furnace from heat trap T, warm air flows back through conduit 61 until diverted by a gate 130L and through a branch pipe 131 to pass into furnace 21 and is then distributed through the heat outlets in the manner previously described. The air after passing through rooms such as X and Y then returns to bin 62 via duct 27 with suitable adjustment of valves 75, 132, 31 and 133. Thus, it will be seen that excess heat produced in the operation of the solar heat trap may be utilized in the household system, if desired, or if not, may be wasted to atmosphere to prevent undue heating of building B.

It will also be desirable to provide an arrangement for heating a portion of the domestic water supply of the building at such times as the heat trap is in operation. As shown in Fig. 1, this is accomplished by providing a heat exchange unit 70 mounted about conduit 35 with a portion of the heated air passing therethrough diverted through a system of flues or similar water jacketed passages to heat the contained water of the unit. A portion of the heated water then passes to a storage tank 71, which tank has a cold water return to unit 70. The remainder of the heated water passes through a line 72 which empties into storage heater 51 located in the basement of building B. Suitable draw-off connections may be provided for both tank 71 and storage heater 51 and it will be understood that whenever the heat trap is unable to supply water at the required temperature, the storage unit 51 will be operated in the usual manner to heat the water required in the household supply.

The heat trap T also may be utilized to provide cooled, conditioned air when required for distribution throughout the building. To accomplish this, the furnace operation is stopped and the heated air delivered through conduit 35 is passed from furnace 21 into a refrigerator unit R through the opening of a suitable valve 76. After passing through generator 90 of refrigerator R, the air passes through duct 137 to duct 32 and recirculates to trap T, damper 139 being suitably adjusted for this operation. Air to be circulated by refrigerator R is drawn into same from duct 27 by a suitable blower unit, the course of flow of air through duct 27 having been changed by operation of a suitable valve 75. The air stream passing into refrigerator R after being suitably cooled is delivered to distributor 23 and then circulated through the various conduits 24a and 24b to the room outlets 25 to reduce the room temperature of rooms X and Y.

Figure 9:
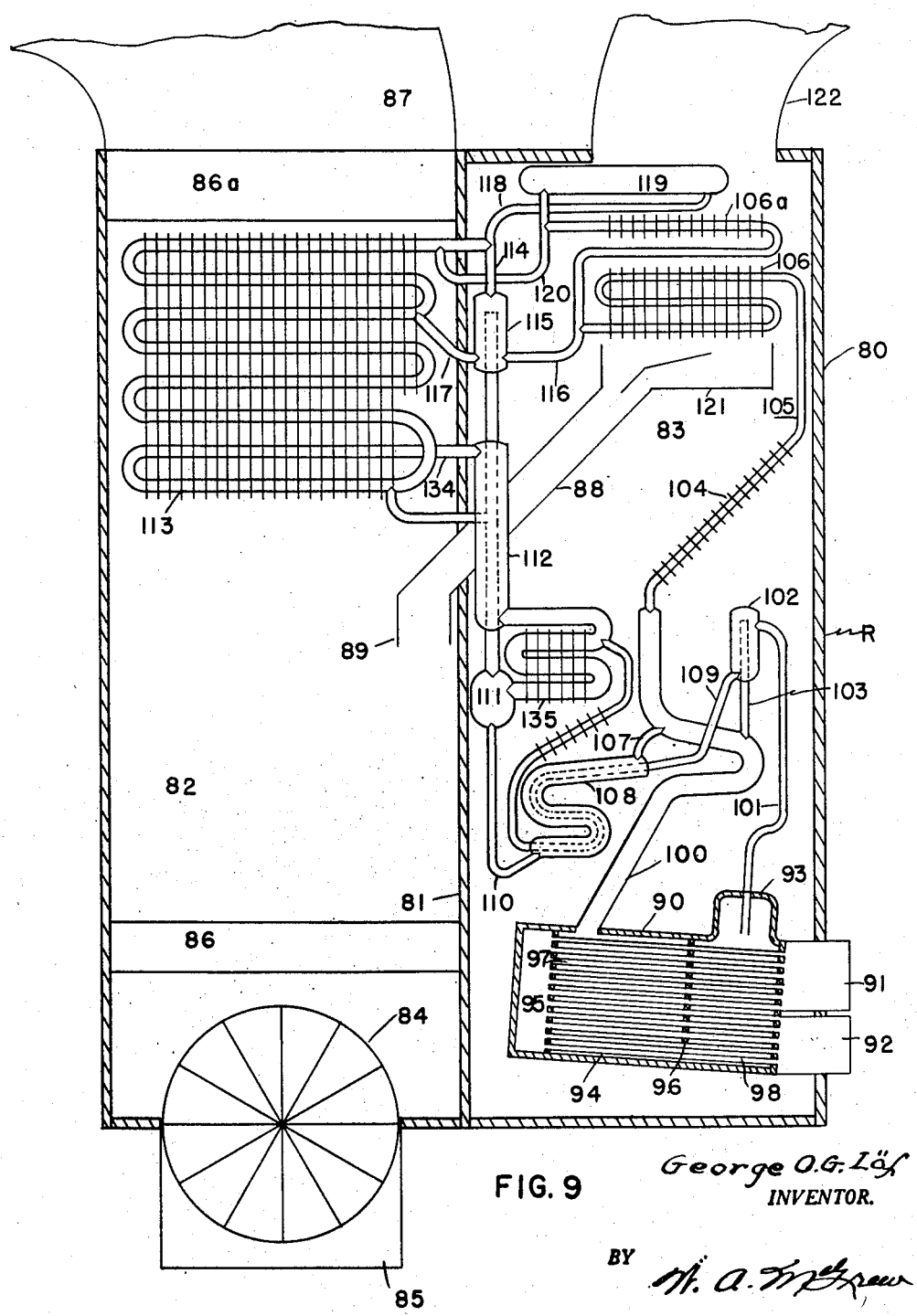
Fig. 9 is a schematic assembly view showing arrangement of parts in an air conditioning unit adapted to be operated by a solar heat trap of the type shown in Fig. 1 in a circulating system of the type shown in Fig. 1.

It will be understood that any suitable refrigerator unit may be used for this purpose and in order to clearly describe the practice of the invention, a suitable air conditioning unit has been illustrated in Fig. 9. This unit comprises a casing 80 having a partition 81 dividing its interior into a cooling chamber 82 and a second compartment 83 in which most of the operating parts are located. The cooling chamber 82 contains a blower 84 preferably having its intake 85 below the casing to receive the returned air flow diverted from duct 27 as previously described. Preferably, compartment 82 will have means for filtering incoming air which may be located at any suitable place, such as the area 86, and a means for humidifying air which may be located at any suitable place, such as the area 86a. An outlet for the air delivered to chamber 82 is provided at its top, as shown at 87, and in the installation shown in Fig. 1, this outlet will deliver the cold air past valve 22 to distributor 23. A conduit 88 having its intake 89 located within compartment 82 extends through partition 81 and discharges its contents within chamber 83 in a manner that will be hereinafter described. The mechanism of this air conditioning unit is of a conventional design of the type used in certain commercial refrigerators except for the generator unit 90 shown in chamber 83, the construction details and operation of which will now be described.

The generator has an air inlet 91 and an air outlet 92 at one of its ends and adjacent thereto a dome 93. The interior of the generator contains a tube section 94 of the general arrangement of conventional boiler construction. The end of the generator opposite inlet 91 contains a space 95 beyond the end of tube section 94 through which the hot air flows to pass into the return passages of tube section 94. A wall 96 divides the tube section into a main heating portion 97 and a secondary heating portion 98, and assists in forming a pressure head in dome 93.

This generator unit is used to vaporize ammonia from an aqueous ammonia solution by a heat transfer action and utilizes hot air supplied from heat trap T in the system shown in Fig. 1. To accomplish this, a conduit 100 delivers aqueous ammonia solution into the enclosure of tube section 94 where it is boiled by the heat transfer action and the resulting vapors rise in the main heating section 97 to pass from the unit through the same conduit 100 through which the solution is delivered to the unit. This counter-current circulation has the further advantage of preheating the solution flowing to generator 90. The gases rising through conduit 100 pass into a rectifier 104 which releases freed ammonia into a line 105 supplying a condenser 106 while the water condensed by rectifier 104 returns to conduit 100.

The gaseous ammonia entering condenser 106 is condensed to the liquid form and passes to evaporator 113 through conduits 116 and 117. Any uncondensed ammonia rises to condenser 106a and the liquid ammonia formed therein passes to the evaporator 113 through conduit 120. The downflowing streams of liquid ammonia meet an upflowing stream of hydrogen gas entering evaporator 113 through conduit 134 hereinafter described, the liquid ammonia being evaporated by said hydrogen accompanied by an extraction of heat from the circulating air in body 82 and thus providing cool air for rooms X and Y. The mixed hydrogen and ammonia vapors then pass from the evaporator through conduit 114, and the inner conduits of 115, and heat exchanger 112, to bulb 111. The gases then pass upward through absorber 135 countercurrent to a downward stream of water hereinafter to be described. The absorber 135 absorbs ammonia from the gases and the remaining hydrogen passes up the outer conduit of heat exchanger 112 to reenter evaporator 113 through conduit 134. The hydrogen reserve tank 119 serves to keep the pressure in the hydrogen system constant during room temperature changes.

When most of the ammonia has been boiled from the aqueous solution in heating section 97 the solution has a higher density and flows to the bottom of the generator 90 and underneath the baffle 96 to the secondary heating section 98 where further evolution of ammonia occurs. The ammonia gas rises into dome 93 creating a pressure which forces the dilute ammonia solution, hereinafter called water, up through conduit 101 into head tank 102. The ammonia vapor accompanying the water continues down conduit 103 to join the main ammonia stream going upward to the condenser from conduit 100. From head tank 102 the water flows by gravity down conduit 109, through the inner conduit of heat exchanger 108, and into the top of absorber 135. The water then flows down the absorber 135 counter-current to the stream of mixed gases flowing upward and absorbs the spent ammonia gases hereinbefore mentioned. The aqueous ammonia solution then flows into bulb 111, down conduit 110, through the annular space in heat exchanger 108, and into conduit 100 through the connecting conduit 107. The aqueous ammonia then flows into the generator 90 to complete the cycle. The flow of aqueous ammonia from the absorber 135 to the generator 90 is actuated by gravity from head tank 102.

The air diverted from chamber 82 which passes through conduit 88 reaches a distributor 121 which directs it across the surfaces of condensers 106 and 106a after which it passes into an outlet 122 to be exposed to atmosphere in any suitable manner as through a stack (not shown).

In the operation of an installation such as that shown in Fig. 1, it frequently will be desirable to store heat generated at heat trap T without circulating hot air through the rooms of the building, as for example, when the temperature of the room is sufficiently high through a preceding heating operation and additional heat is passing from the discharge of the heat trap. Under these circumstances, a damper 130r in furnace 21 is moved to close the passage through valve 22 to distributor 23 and a damper 130L is opened to allow the gases entering the furnace through intake 26 to pass into conduit 61, the valve in branch conduit 131 being closed. At the same time, damper 75 is moved to shut off the flow of cool air through duct 27 and another valve 132 is closed to block the passage between duct 27 and intake 26 while a valve 133 is open to permit an outward flow of heated air from storage bin 62.

When so arranged, the heated air leaving trap T flows downwardly through conduit 35 and into furnace 21 through intake 26. Having no escape except through conduit 61 hot air passes through duct 61 into storage bin 62. Through the opening of valve 133, a pronounced flow of air through bin 62 is obtained with the air returning therefrom entering conduit 32 past valve 31 which also has been open and thus the air returns to the entrance 33 of heat trap T.

So long as this operation is allowed to continue, the circulating air will be progressively heated, thus raising the temperature of the bed 63 in bin 62 and as this circuit is insulated from other portions and particularly the occupied portions of the building, no appreciable temperature rise occurs in these occupied portions. This circulation will be allowed to continue so long as the solar heat trap is functioning and whenever there is a further demand for heat, either from furnace 21 or air conditioner R or the water heating stages previously described, the circulation can be discontinued and the generated heat made available where required.

When stored heat is to be used for the operation of air conditioning unit R, hot air is drawn through duct 61 from storage bin 62. This hot air proceeds to duct 35 through duct 131 by suitable adjustment of dampers 131 and 130L. The hot air then flows into furnace 21 and into refrigerator R by suitable adjustment of damper 76 and after being used flows through duct 137 and 138 and back into heat storage unit 62 by suitable adjustment of vane 139 and damper 133. It is possible, if desired, to operate the refrigerator R by applying heat from natural or artificial gas or other similar fuel when the heat storage unit is cold and trap T is cold.

In the operation of the system previously described, the location of by-pass conduit 56 provides a convenient arrangement to prevent overheating of the storage water supply which otherwise might occur if heat exchange unit 70 were operated at all times when hot air was flowing through conduit 35. Whenever the temperature of the water in tank 71 reaches an established maximum, the valve 55 may be closed and valve 57 opened to permit the flow of the hot air through branch 56 and thence back to conduit 35 without heating the water in the heat exchange unit 70. Preferably, a thermostat control will be utilized to provide automatic regulation at this stage, although manual or other types of operation may be used, if desired.

In Fig. 1, no attempt has been made to show the insulation of the heat trap, conduit, storage bin and the like. However, it will be understood from the foregoing description that suitable heat insulation may be provided for all of the conductive parts of the system and the insulation to be used for this purpose may be any one of a variety of materials available on the market for such purposes.

Next referring to Fig. 2, it will be understood that if desired this form of construction may be utilized as a water heating unit rather than an air heating unit as described. In order to do so, it will be necessary to make the entire closure, inclusive of bottom 36, side walls 37 and cover plate 38, into a watertight assembly and then pump water in under pressure through the opening 33 to effect its movement across the heat exchange surfaces and its ultimate discharge at outlet 34. As the production of such a unit would involve construction difficulties in providing sufficient structural strength to carry the load and to withstand the pressures required in the pumping action, I prefer to use the form of construction illustrated in Fig. 3 whenever the heat trap is to be used in heating water rather than a gaseous fluid.

In assembling the heat trap in the roof of a structure, various arrangements may be employed. Where the installation is to be made in existing structure, the arrangement shown in Fig. 4 is particularly suitable and comprises upright walls 37x which cooperate with end walls 37 (not shown) preferably of similar width and thickness to form a box-like enclosure. The enclosure has a bottom 36 of the type hereinbefore described which preferably comprises the roofing material and the interior space of the enclosure is insulated from the building enclosure by a strip or bed of suitable heat insulating composition 36a.

As previously explained, it is necessary to have some suitable transparent cover for the enclosure and this is most conveniently effected by arranging a plurality of glass plates in tiers or layers with a portion of an end surface of one plate overlying another end portion of a second similar plate, a greater portion of which projects beyond the first said plate in a direction lengthwise of the enclosure. When it is necessary to brace the respective plates to support the weight of the cover assembly, suitable straps or bars of wood or metal may be arranged to bridge the space between the members 37x in supporting relation to the cover plate glass.

Figure 8:
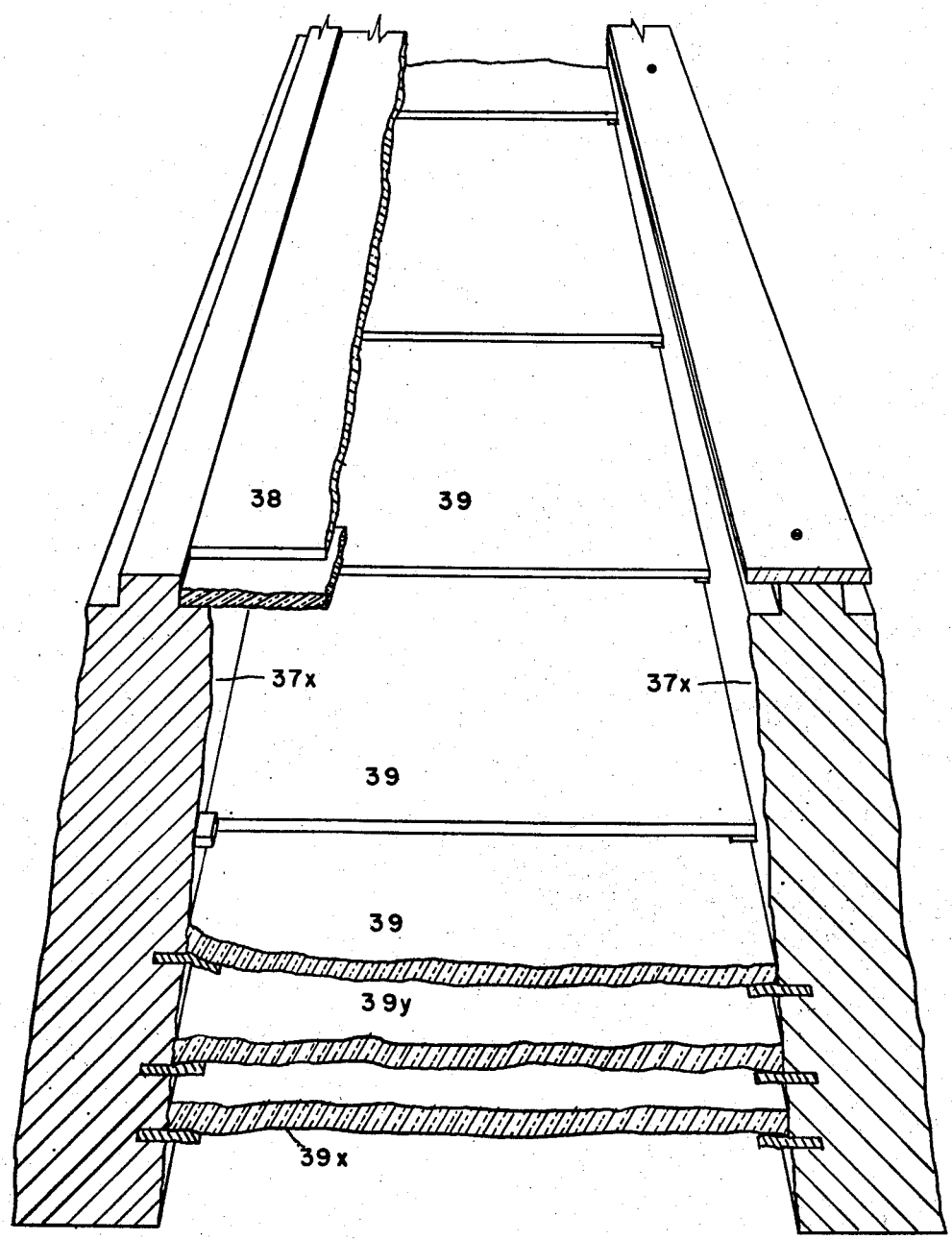
Fig. 8 is an enlarged perspective view partially broken to show interior construction in section of one form of heat trap used in the practice of the present invention.

The arrangement just described will be best understood by reference to Fig. 8 which is a perspective view partially broken away to illustrate an assembly of this character. While the arrangement shown in Fig. 8 is illustrative in general of all the arrangements shown in Figs. 4, 5 and 6, it is more exactly a representation of the construction shown in Fig. 4 and consequently has been given corresponding reference numerals. In the preceding description, the arrangement of transparent and opaque surfaces has been described as being embodied in a plate of glass. While this is a preferred arrangement because of the simplicity of construction and assembly, it will be understood that the opaque black areas may be any suitable material which is non-reflecting, and if desired, may be separate pieces arranged in end to end relation with the transparent plates of glass or other suitable composition.

Where the heat trap units are to be installed in new constructions, it is possible to use the rafters 37y of the roof structure as a part of the trap enclosure, mounting thereon a cover plate 38 in all respects the same as the cover plate 38 shown in Fig. 4 and providing insulation 36a of the type previously described with a bottom portion 36x preferably attached to and in underhanging relation to the rafters 37y. Within the enclosure, the arrangement of transparent and opaque surfaces previously described will be provided.

Still another arrangement has been illustrated in Fig. 6 in which the enclosure is formed to seat upon rafters 37z and has end walls (not shown) similar to those previously described. A bottom piece 36z encloses the space between two adjoining rafters 37z while the usual type of transparent cover plate will be provided at the top of the enclosure. As clearly shown in Fig. 6, the material of the bottom portion 36z is U shaped in section and fits against the top and side surfaces of the rafter 37z. Through this arrangement, it is possible to order any required number of such trap units and mount same on rafters or other upstanding supports with the respective units joined in side by side relation as indicated in Fig. 6.

From the foregoing description, it will be apparent that the solar heating system of the present invention is well suited for incorporation in new constructions or in existing structures, and only a minor amount of the habitable space of the house or other structure is occupied by component parts of the system. When desired, the solar heat trap may be supplemented as a heat source by standard type furnaces, water heaters and refrigerators, although with proper capacity in the heat trap and heat storage units such standby appliances will be unnecessary in many installations.

The accompanying drawings illustrate typical installations for carrying out the purposes of the present invention, and it will be understood that variations in the construction and operation are within contemplation of the invention. Therefore, the construction and arrangement of parts shown and described is not intended to limit the invention, the scope of which is set forth in the hereunto appended claims.

What I claim and desire to secure by Letters Patent is:

1. In a solar heat trap having a box-like enclosure and a transparent cover disposed to intercept solar rays, said trap having an inlet end and an outlet end, a series of glass plates arranged in spaced and substantially parallel relation to the cover plate and to one another with their ends in overlapped relation and in spaced relation to the ends of the enclosure, each said plate having a transparent portion and an opaque portion, and the series of opaque portions being arranged to provide a continuous radiation-absorption surface to the solar rays entering through the transparent cover, and means including a fluid-circulating mechanism for flowing streams of fluid along the succession of plates from one end of said series to the other.

2. In a solar heat trap having a box-like enclosure and a transparent top closure positioned to admit solar rays to the trap, a series of transparent heat exchange members arranged in vertically spaced tiers within the trap and in substantially parallel relation to said closure to provide a plurality of fluid-conducting passages, at least a portion of the surface underlying each transparent area being constructed and arranged to have a non-reflective area directed toward the sun and a reflective area directed away from the sun on at least all tiers except the lowermost to thereby maintain a heat-transfer action on the top and bottom surfaces of the heat exchange members, and said nonreflective areas collectively providing a continuous non-reflective surface throughout at least one dimension of the trap.

3. In a solar heat trap having a box-like enclosure and a transparent top closure positioned to intercept solar rays, said trap having an inlet end and an outlet end, a series of transparent heat exchange members arranged in vertically spaced tiers within the trap and in substantially parallel relation to said closure to provide a plurality of fluid-conducting passages, at least a portion of the surface underlying each transparent area being constructed and arranged to have a non-reflective area directed toward the sun and a reflective area directed away from the sun on at least all tiers except the lowermost to thereby maintain a heat-transfer action on the top and bottom surfaces of the heat exchange members, and said non-reflective areas collectively providing a continuous non-reflective surface throughout the trap.

4. A heating system for buildings comprising means on an exterior surface of a building for heating air with solar rays, air circulating means, inclusive of a blower and conduits, for delivering air so heated into a room of the building and for returning cool air from said room to the solar heating means, a water heating unit in the building associated with one of said conduits and arranged to heat the water by the passage therethrough of hot air from the solar heating means, and a valve-controlled by-pass conduit for conducting said hot air around said water-heating unit when the water therein attains a predetermined temperature.

5. The process of heating a fluid within an enclosed space having inlet and outlet ends and a transparent portion exposed to solar radiation entering said space in a position substantially perpendicular to the rays, which comprises exposing a plurality of spaced, transparent heat-exchange units disposed in substantially parallel relation to the transparent portion exposed to the solar rays and supported in spaced relation to said inlet and outlet ends of the enclosed space, at least a portion of each said unit being opaque so as to induce a counterflow between radiant and sensible heat within the space between superposed units, and a superposed portion of another unit in the path of said sensible heat counterflow being transparent, and passing the fluid to be heated between the inlet and the outlet in contacting relation with the respective heat-exchange surfaces of said units so as to impart a progressive temperature increase to the fluid contacting said surfaces.

6. The process of heating a fluid within an enclosed space having inlet and outlet ends and a transparent portion exposed to solar radiation entering said space in a position substantially perpendicular to the rays, which comprises exposing a plurality of spaced, transparent heat-exchange units disposed in substantially parallel relation to the transparent portion exposed to the solar rays and supported in spaced relation to said inlet and outlet ends of the enclosed space, at least a portion of each said unit being opaque so as to induce a counterflow between radiant and sensible heat within the space between superposed units and a superposed portion of another unit in the path of said sensible heat counterflow being transparent, and passing a gas to be heated from a lower inlet in said enclosed space to an upper outlet therefrom and in contacting relation with the respective heat-exchange surfaces of said units so as to impart a progressive temperature increase to the fluid contacting said surfaces.

7. The process of heating a fluid within an enclosed space having inlet and outlet ends and a transparent portion exposed to solar radiation entering said space in a position substantially perpendicular to the rays, which comprises exposing a plurality of spaced, transparent heat-exchange units disposed in substantially parallel relation to the transparent portion exposed to the solar rays and supported in spaced relation to said inlet and outlet ends of the enclosed space, at least a portion of each said unit being opaque so as to induce a counterflow between radiant and sensible heat within the space between superposed units, and a superposed portion of another unit in the path of said sensible heat counterflow being transparent, and passing a liquid to be heated from an upper inlet in said enclosed space to a lower outlet therefrom and in contacting relation with the heat-exchange surfaces of said units so as to impart a progressive temperature increase to the fluid contacting said surfaces.

8. A process as defined in claim 5, in which the fluid entering through said inlet is at a temperature substantially below the temperature of said heat-exchange units.

9. The process of heating a fluid within an enclosed space having inlet and outlet ends and a transparent portion exposed to solar radiation entering said space in a position substantially perpendicular to the rays, which comprises exposing a plurality of spaced, transparent heat-exchange units disposed in substantially parallel relation to the transparent portion exposed to the solar rays and supported in spaced relation to said inlet and outlet ends of the enclosed space, at least a portion of each said unit being opaque so as to induce a counterflow between radiant and sensible heat within the space between superposed units, and a superposed portion of another unit in the path of said sensible heat counterflow being transparent, circulating air from a space to be heated through the counterflow zone between said units from one end to the other thereof in contact with the top and bottom surfaces of said units and conducting the air thus heated to the space from which it has been withdrawn so as to impart a progressive temperature increase to the fluid contacting said surfaces.

10. The process of heating a fluid within an enclosed space having inlet and outlet ends and a transparent portion disposed substantially perpendicular to solar radiation entering said space, which comprises exposing a plurality of spaced, transparent heat exchange units disposed in substantially parallel relation to said transparent portion exposed to the solar rays and supported in spaced relation to inlet and outlet ends of the enclosed space, at least a portion of each said unit being opaque so as to induce a counterflow between radiant and sensible heat within the space between superposed units, and a superposed portion of another unit in the path of said sensible heat counterflow being transparent, and passing the fluid to be heated between the inlet and the outlet in contacting relation with the respective heat-exchange surfaces of said units so as to impart a progressive temperature increase to the fluid contacting said surfaces.

11. In a process of heating a fluid within an enclosed space having a transparent portion disposed substantially perpendicular to the path of solar radiation in a position to intercept such radiation entering said space, exposing a plurality of spaced transparent heat-exchange units disposed in parallel to the transparent portion intercepting said radiation and supported in spaced relation to the ends of said space, at least a portion of each said unit being opaque so as to induce a counterflow between radiant and sensible heat within the space between superposed units, thereby heating the upper and lower surfaces of said units substantially uniformly circulating air from a space to be heated through said enclosed space in a plurality of streams at different elevations therein, each said stream being directed in contacting relation with the upper and lower surfaces of a plurality of said units to extract heat therefrom and returning the air thus heated to the space from which it has been withdrawn.

12. In a solar heat trap having a box-like enclosure and including inlet and outlet ends, a transparent cover disposed in the path of solar radiation throughout substantially its entire area, a series of glass plates supported in vertically spaced and substantially parallel relation in the enclosure and spaced from the inlet and outlet ends, said plates being inclined at a substantial angle to the direction of solar rays admitted by said cover; the ends of said plates being arranged in overlapped relation and said plates including opaque and transparent portions so as to provide continuous radiation-absorption surfaces to the solar rays entering through the cover; and means, including a fluid-circulating mechanism, for flowing streams of fluid along the succession of plates from one end of the series to the other, and the transparent areas of upper plates being arranged in vertically-spaced relation to the opaque areas of an adjoining lower plate so as to bring said circulating fluid into contact with surfaces of progressively increasing temperature during exposure to solar rays as said fluid travels from the inlet end to the outlet end of said enclosure.

13. A heat trap as defined in claim 12 in which the opaque portions of the plates comprise a layer of black paint on the upper surface and a layer of metal foil on the under surface of the glass.

14. In a solar heat trap having a box-like enclosure including inlet and outlet ends, a transparent cover disposed in the path of solar radiation throughout substantially its entire area, a series of glass plates supported in vertically spaced and substantially parallel relation in the enclosure and spaced from said inlet and outlet ends, said plates being inclined lengthwise in the enclosure in a position to expose a major portion of their surfaces to solar radiation admitted by said cover, the ends of said plates being arranged in overlapped relation and said plates including opaque and transparent portions so as to provide continuous radiation-absorption surfaces to the solar rays, means, including a fluid-circulating mechanism, for flowing streams of fluid along the succession of plates from one end of the series to the other, and the transparent areas of upper plates being arranged in vertically spaced relation to the opaque areas of an adjoining lower plate so as to bring said circulating fluid into contact with surfaces of progressively increasing temperature during exposure to solar rays as said fluid travels from the inlet end to the outlet end of said enclosure.

15. In apparatus of the character described, the combination with structure forming a chamber having at least one wall transparent to solar radiation and having inlet and outlet ends, of a series of relatively transparent plates extending across the chamber in spaced relation with their upper surfaces adapted to transmit solar radiation and arranged to divide the chamber into at least one upper and at least one lower passageway and to collectively cover the cross-sectional extent of the chamber except at the inlet and outlet ends, said plates being disposed in substantially parallel relation to the surface on which the chamber is supported, and the plates in an upward progression being arranged to progressively lap the next lower plate in the direction of the outlet end, heat-absorbing media positioned under at least a portion of said plates so as to absorb the solar radiation transmitted through said plates and to convert said solar radiation into sensible heat, and means including a fluid circulating mechanism, for flowing streams of fluid along the succession of plates from one end of the series to the other so as to bring the fluid into contact with surfaces of progressively increasing temperature as it travels from the inlet to the outlet end of the chamber.

16. A solar heater comprising a box with a transparent cover portion inclined toward the horizontal, a series of spaced parallel heat absorption sheets partly transparent and partly covered with a heat absorbing layer, said heat absorption sheets being arranged one above the other in a stepped relationship along a zone subdividing the box substantially into two sections communicating with each other by passages formed by the spaces left between adjacent absorption sheets, the transparent portion of each sheet covering the portion of the sheet located underneath which is covered with the heat absorbing layer, an air inlet in communication with one of the subdivisions of the box, and an air outlet in communication with the other subdivision of the box, a water heating system and means for transmitting the heat carried by the air, circulating between the outlet and inlet of the box, to said water heating system.

17. A solar heater comprising a box with a transparent cover portion and with a parallel bottom portion, both inclined toward the horizontal, a series of closely adjacent spaced, partly transparent and partly opaque heat absorption sheets, arranged one above the other in a stepped relationship, each sheet overlapping a portion of the sheet underneath, the entire series of absorption sheets being arranged in a zone running diagonally through the box and inclined toward the horizontal, said series of absorption sheets subdividing the box substantially into two sections communicating by the passages left between adjacent absorption sheets thus exposing the volume of the air circulating between the sections of the box to the action of the heat absorption sheets, an inlet opening in one section of the box, an outlet opening in the second section of the box, a closed air circulation system outside the box between the air inlet and the air outlet, a water heating system, a heat exchanger forming part of said water circulating system arranged within the air circulating system for transmitting the heat acquired by the air circulating in the air circulating system to the heat exchanger of the water circulating system.

18. A solar heater comprising a box with a transparent wall, inclined toward the horizontal at a predetermined angle, a series of spaced parallel, partly transparent heat absorption sheets arranged one above the other and overlapping each other in a stepped relation, said absorption sheets being further arranged in substantial parallelism to the transparent wall of the box and aligned along a diagonal plane of the box subdividing the latter susbtantially into two sections, said transparent portions of each heat absorption sheet covering the heat absorbing portion of the absorption sheet beneath it, the spaces between the absorption sheets forming passageways extending substantially along one plane for transmitting heat from the adjacent heat absorption sheets to the circulating air, an air intake means at the lower end of the box, an air discharge means at the upper end of said box to produce a continuous circulation of the air, the circulating air within said box being divided into a plurality of thin air streams spread over large heated surfaces for effective heat transmission during circulation through said box.

19. A solar heater comprising a box with a transparent cover portion, inclined toward the horizontal, a series of spaced, parallel heat absorption sheets, partly transparent and partly covered with a heat absorbing layer, said heat absorption sheets being arranged one above the other in a stepped relationship along a zone subdividing the box substantially into two sections communicating with each other by the passages between the absorption sheets, the transparent portion of each sheet covering the portion of the sheet located underneath which is covered by the heat absorbing layer, an air inlet in communication with one section of the box, an air outlet in communication with the other section of the box, a closed air circulation system outside the box between said air inlet and said air outlet including a heat exchanger comprising means providing separate paths for the passage of air and water therethrough in heat exchange relationship, and a water storage and circulating system including a tank, a pipe system connected with said water circulating system and the water passage means of said exchanger, means for feeding cold water to said water circulating system and means for withdrawing warm water from said water circulating system.

References Cited in the file of this patent

UNITED STATES PATENTS

| Number | Name | Date |
|---|---|---|
| 102,633 | Wheeler et al. | May 3, 1870 |
| 117,476 | Sperry | July 25, 1871 |
| 201,439 | Moreau | Mar. 19, 1878 |
| 246,626 | Morse | Sept. 6, 1881 |
| 291,146 | Calver | Jan. 11, 1884 |
| 300,995 | Meeker | June 24, 1884 |
| 430,762 | Taylor | June 24, 1890 |
| 965,391 | Little | July 26, 1910 |
| 984,585 | McHenry | Feb. 21, 1911 |
| 995,219 | Bradley | June 13, 1911 |
| 1,130,870 | Willsie | Mar. 9, 1915 |
| 1,338,644 | Arthur | Apr. 27, 1920 |
| 1,467,005 | Lawrence | Sept. 4, 1923 |
| 1,661,473 | Goddard et al. | Mar. 6, 1928 |
| 1,814,897 | Coxe | July 14, 1931 |
| 1,888,620 | Clark | Nov. 22, 1932 |
| 2,221,971 | Haywood | Nov. 19, 1940 |
| 2,241,070 | McLenegan | May 6, 1941 |
| 2,311,579 | Scott | Feb. 16, 1943 |
| 2,342,211 | Newton | Feb. 22, 1944 |
| 2,348,835 | Mueller | May 16, 1944 |
| 2,469,496 | Christenson | May 10, 1949 |
| 2,484,127 | Stelzer | Oct. 11, 1949 |